United States Patent
McNew

(10) Patent No.: US 11,169,519 B2
(45) Date of Patent: Nov. 9, 2021

(54) ROUTE MODIFICATION TO CONTINUE FULLY-AUTONOMOUS DRIVING

(71) Applicant: TOYOTA MOTOR ENGINEERING & MANUFACTURING NORTH AMERICA, INC., Plano, TX (US)

(72) Inventor: John-Michael McNew, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 185 days.

(21) Appl. No.: 16/239,208

(22) Filed: Jan. 3, 2019

(65) Prior Publication Data

US 2020/0218256 A1  Jul. 9, 2020

(51) Int. Cl.
 *G05D 1/00* (2006.01)
 *G05D 1/02* (2020.01)
 *G01C 21/36* (2006.01)
 *G01C 21/34* (2006.01)

(52) U.S. Cl.
 CPC ....... *G05D 1/0061* (2013.01); *G01C 21/3415* (2013.01); *G01C 21/3691* (2013.01); *G05D 1/0214* (2013.01); *G05D 1/0217* (2013.01); *G05D 2201/0213* (2013.01)

(58) Field of Classification Search
 CPC ............... G05D 1/0061; G05D 1/0217; G05D 2201/0213; G01C 21/3415; G01C 21/3691
 See application file for complete search history.

(56) References Cited

U.S. PATENT DOCUMENTS

| | | |
|---|---|---|
| 9,494,439 B1 | 11/2016 | Ross |
| 9,534,918 B2 | 1/2017 | Nemec |
| 9,707,966 B2 | 7/2017 | Herbach |
| 2017/0219364 A1 | 8/2017 | Lathrop |
| 2017/0370740 A1 | 12/2017 | Nagy |
| 2018/0203455 A1* | 7/2018 | Cronin ............... G01C 21/3461 |
| 2018/0364700 A1* | 12/2018 | Liu ...................... G05D 1/0055 |

OTHER PUBLICATIONS

SAE International, SAE International Releases Updated Visual Chart for Its "Levels of Driving Automation" Standard for Self-Driving Vehicles, Dec. 11, 2018, SAE International, p. 2 (Year: 2018).*

* cited by examiner

*Primary Examiner* — Alan D Hutchinson
*Assistant Examiner* — Andy Schneider
(74) *Attorney, Agent, or Firm* — Sheppard, Mullin, Richter & Hampton LLP; Hector A. Agdeppa; Daniel N. Yannuzzi

(57) ABSTRACT

A system and method for route modification to continue fully-autonomous driving is provided. The method includes operating a vehicle in a Level 3 autonomous driving mode according to a determined route; collecting data in real time concerning the route ahead of the vehicle; based on the collected data, identifying areas of the route ahead of the vehicle that would require the vehicle to leave the Level 3 autonomous driving mode; modifying the route based on the identified areas to continue operating in the Level 3 autonomous driving mode; and operating the vehicle in a Level 3 autonomous driving mode according to the modified route.

19 Claims, 8 Drawing Sheets

ROUTE MODIFICATION TO CONTINUE FULLY-AUTONOMOUS DRIVING

TECHNICAL FIELD

The present disclosure relates generally to vehicles. In particular, embodiments of the present disclosure relate to autonomous vehicles.

DESCRIPTION OF RELATED ART

Modern autonomous vehicles generally provide multiple driving modes, which are differentiated by the amount of driver interaction required. In a highly-autonomous driving mode, no driver interaction is required; the driver may read, sleep, and the like. In a manual driving mode, full driver interaction is required; the driver must maintain full control of the vehicle, aside from the use of basic features such as cruise control. In a semi-autonomous mode, some driver interaction is required; the driver must be ready to take full control of the vehicle, as in manual mode.

BRIEF SUMMARY OF THE DISCLOSURE

In general, one aspect disclosed features a vehicle comprising: a processor; and a non-transitory machine-readable storage medium encoded with instructions executable by the processor, the machine-readable storage medium comprising instructions to cause the processor to perform a method comprising: operating the vehicle in a Level 3 autonomous driving mode according to a determined route; collecting data in real time concerning the route ahead of the vehicle; based on the collected data, identifying areas of the route ahead of the vehicle that would require the vehicle to leave the Level 3 autonomous driving mode; modifying the route based on the identified areas to continue operating in the Level 3 autonomous driving mode; and operating the vehicle in a Level 3 autonomous driving mode according to the modified route.

Embodiments of the vehicle may include one or more of the following features. In some embodiments, identifying areas of the route ahead of the vehicle that would require the vehicle to leave the Level 3 autonomous driving mode comprises: identifying areas of the route ahead of the vehicle where a safe automatic stop of the vehicle cannot be performed. In some embodiments, identifying areas of the route ahead of the vehicle that would require the vehicle to leave the Level 3 autonomous driving mode comprises: identifying a lane of a road of the route ahead of the vehicle from which a safe automatic stop of the vehicle cannot be performed. In some embodiments, modifying the route comprises: navigating the vehicle from the identified lane to another lane. In some embodiments, the method further comprises: modifying the route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination. In some embodiments, the method further comprises: presenting a proposed route to an occupant of the vehicle; and modifying the route only after receiving a confirmation from the occupant. In some embodiments, the method further comprises: collecting the data in real time using at least one of sensors on the vehicle, communication with other vehicles, a map database, and a position of the vehicle.

In general, one aspect disclosed features a non-transitory machine-readable storage medium encoded with instructions executable by a hardware processor of a computing component of a vehicle, the machine-readable storage medium comprising instructions to cause the hardware processor to perform a method comprising: operating the vehicle in a Level 3 autonomous driving mode according to a determined route; collecting data in real time concerning the route ahead of the vehicle; based on the collected data, identifying areas of the route ahead of the vehicle that would require the vehicle to leave the Level 3 autonomous driving mode; modifying the route based on the identified areas to continue operating in the Level 3 autonomous driving mode; and operating the vehicle in a Level 3 autonomous driving mode according to the modified route.

Embodiments of the medium may include one or more of the following features. In some embodiments, identifying areas of the route ahead of the vehicle that would require the vehicle to leave the Level 3 autonomous driving mode comprises: identifying areas of the route ahead of the vehicle where a safe automatic stop of the vehicle cannot be performed. In some embodiments, identifying areas of the route ahead of the vehicle that would require the vehicle to leave the Level 3 autonomous driving mode comprises: identifying a lane of a road of the route ahead of the vehicle from which a safe automatic stop of the vehicle cannot be performed. In some embodiments, modifying the route comprises: navigating the vehicle from the identified lane to another lane. In some embodiments, the method further comprises: modifying the route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination. In some embodiments, the method further comprises: presenting a proposed route to an occupant of the vehicle; and modifying the route only after receiving a confirmation from the occupant. In some embodiments, the method further comprises: collecting the data in real time using at least one of sensors on the vehicle, communication with other vehicles, a map database, and a position of the vehicle.

In general, one aspect disclosed features a method for operating a vehicle, the method comprising: operating the vehicle in a Level 3 autonomous driving mode according to a determined route; collecting data in real time concerning the route ahead of the vehicle; based on the collected data, identifying areas of the route ahead of the vehicle that would require the vehicle to leave the Level 3 autonomous driving mode; modifying the route based on the identified areas to continue operating in the Level 3 autonomous driving mode; and operating the vehicle in a Level 3 autonomous driving mode according to the modified route.

Embodiments of the method may include one or more of the following features. In some embodiments, identifying areas of the route ahead of the vehicle that would require the vehicle to leave the Level 3 autonomous driving mode comprises: identifying areas of the route ahead of the vehicle where a safe automatic stop of the vehicle cannot be performed. In some embodiments, identifying areas of the route ahead of the vehicle that would require the vehicle to leave the Level 3 autonomous driving mode comprises: identifying a lane of a road of the route ahead of the vehicle from which a safe automatic stop of the vehicle cannot be performed. In some embodiments, modifying the route comprises: navigating the vehicle from the identified lane to another lane. Some embodiments comprise modifying the route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination. Some embodiments comprise presenting a proposed route to an occupant of the vehicle; and modifying the route only after receiving a confirmation from the occupant.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

The levels of autonomous driving are described herein with reference to the SAE (J3016) Automation Levels standard. According to that standard, Level 2 autonomous driving is defined as the driving mode-specific execution by one or more driver assistance systems of both steering and acceleration/deceleration using information about the driving environment and with the expectation that the human driver performs all remaining aspects of the dynamic driving task. And according to that standard, Level 3 autonomous driving is defined as the driving mode-specific performance by an automated driving system of all aspects of the dynamic driving task with the expectation that the human driver will respond appropriately to a request to intervene.

Various embodiments are directed to maximizing the amount of time an autonomous vehicle may remain in Level 3 autonomous driving mode. The technology disclosed herein plans routes that are safe, and that maximize the amount of time spent in Level 3 autonomous driving mode.

In some embodiments, the system attempts to determine areas where Level 3 autonomous driving would drop to Level 2 or lower levels, referred to herein as "Level 2 or lower areas." This may happen for instance in cases where a travel lane has no shoulder for a safe stop or in construction zones. The system attempts to avoid these areas, for example by selecting different lane or route.

In some embodiments, the system determines Level 2 or lower areas in real time using onboard sensors and communication with other vehicles.

In some embodiments, the system determines Level 2 or lower areas using GPS and pre-mapped databases. In some embodiments, the system determines Level 2 or lower areas using real-time traffic information, vehicle-to-vehicle communication, vehicle-to-infrastructure, or other off-board sensors.

Figure 1:
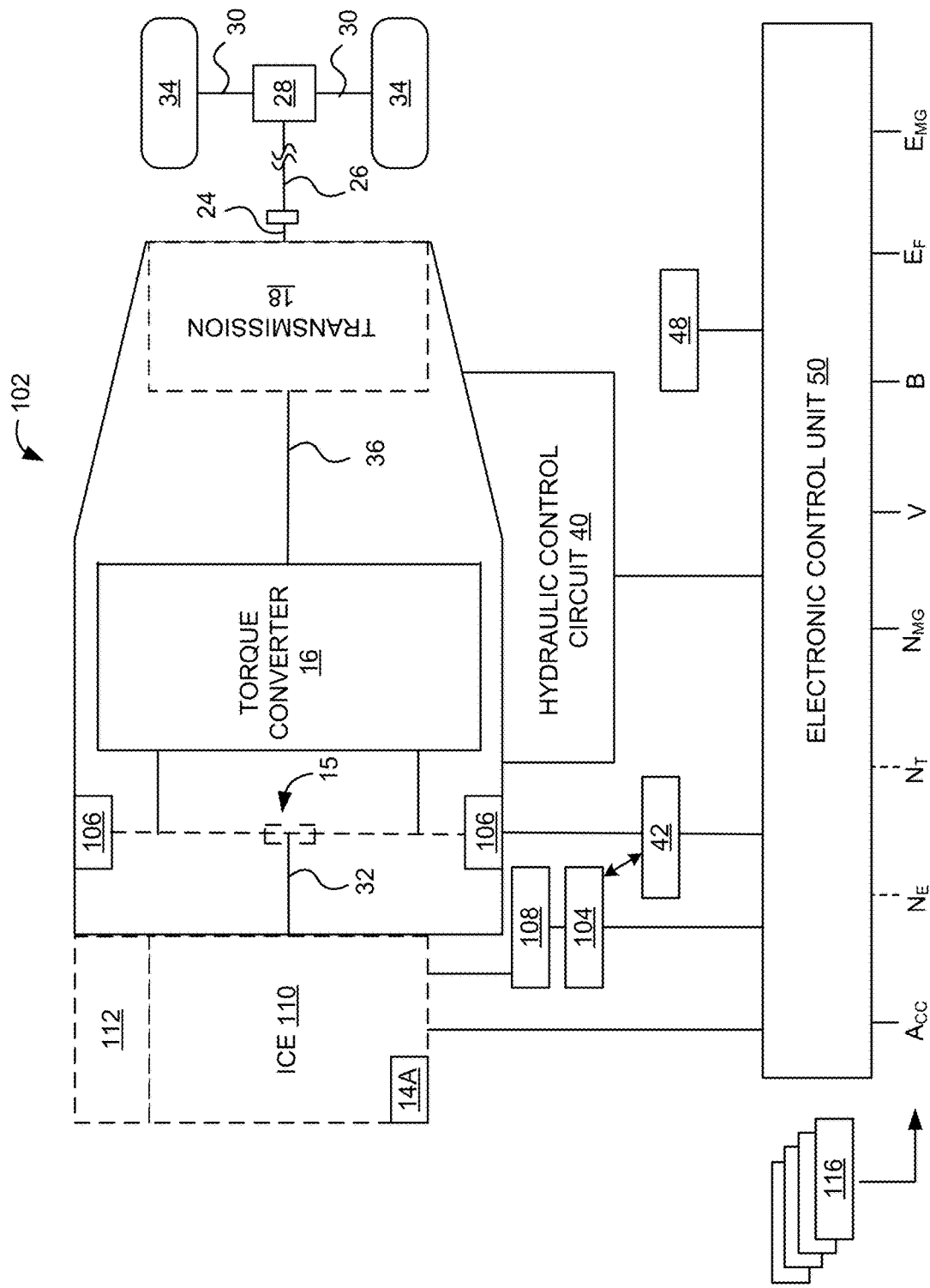
FIG. 1 illustrates an example vehicle in which embodiments of the disclosed technology may be implemented.

An example vehicle 102 in which embodiments of the disclosed technology may be implemented is illustrated in FIG. 1. The vehicle depicted in FIG. 1 is a hybrid electric vehicle. However, the disclosed technology is independent of the means of propulsion of the vehicle, and so applies equally to vehicles without an electric motor, and to vehicles without an internal combustion engine.

FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 110 (engine RPM), a rotational speed, $N_{MS}$, of the motor 106 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to engine control unit 50 (which, again, may be implemented as one or a plurality of individual control circuits). In one embodiment, sensors 116 may be included to detect one or more conditions directly or indirectly such as, for example, fuel efficiency, $E_F$, motor efficiency, $E_{MG}$, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well.

Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, the presence or absence of a road shoulder and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
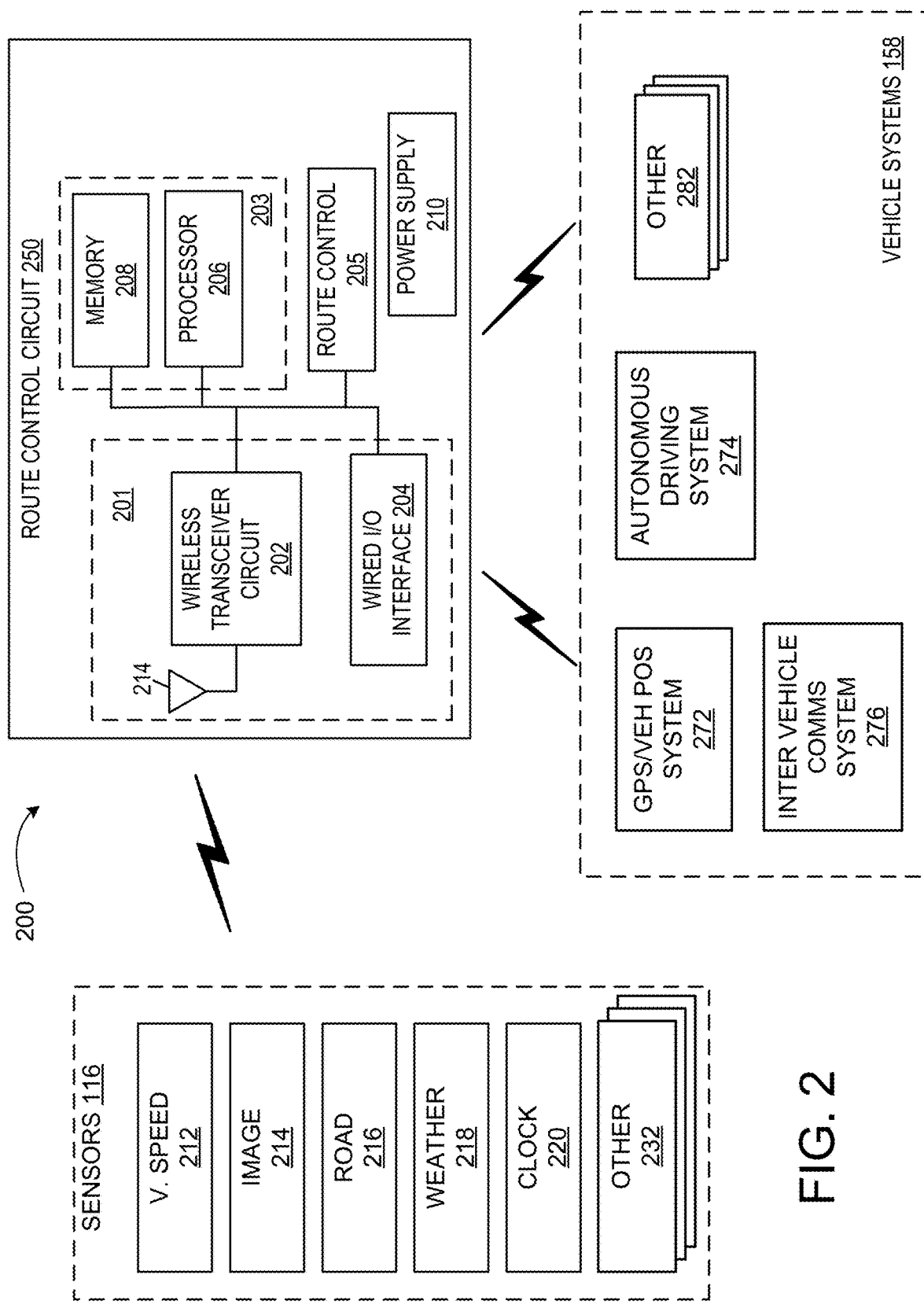
FIG. 2 illustrates an example architecture for modifying the route of an autonomous vehicle in accordance with one embodiment

FIG. 2 illustrates an example architecture for modifying the route of an autonomous vehicle in accordance with one embodiment of the systems and methods described herein. Referring now to FIG. 2, in this example, a vehicle route control system 200 includes a route control circuit 210, a plurality of sensors 116, and a plurality of vehicle systems 158. Sensors 116 and vehicle systems 158 can communicate with route control circuit 210 via a wired or wireless communication interface. Although sensors 116 and vehicle systems 158 are depicted as communicating with route control circuit 210, they can also communicate with each other as well as with other vehicle systems. Route control circuit 210 can be implemented as an ECU or as part of an ECU such as, for example electronic control unit 50. In other embodiments, route control circuit 210 can be implemented independently of the ECU.

Route control circuit 210 in this example includes a communication circuit 201, a processing circuit 203 (including a processor 206 and memory 208 in this example) and a power supply 212. Components of route control circuit 210 are illustrated as communicating with each other via a data bus, although other communication interfaces can be included. Route control circuit 210 in this example also includes a route control 205 that can be operated by the user to control the route control circuit 210, for example by manual controls, voice, and the like.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to route control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a route control circuit 210.

Communication circuit 201 either or both a wireless transceiver circuit 202 with an associated antenna 214 and a wired I/O interface 204 with an associated hardwired data port (not illustrated). As this example illustrates, communications with route control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by route control circuit 210 to/from other entities such as sensors 116 and vehicle systems 158.

Wired I/O interface 204 can include a transmitter and a receiver (not shown) for hardwired communications with other devices. For example, wired I/O interface 204 can provide a hardwired interface to other components, including sensors 116 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, NiH$_2$, rechargeable, primary battery, etc.), a power connector (e.g., to connect to vehicle supplied power, etc.), an energy harvester (e.g., solar cells, piezoelectric system, etc.), or include any other suitable power supply.

Sensors 116 may include additional sensors that may or not otherwise be included on a standard vehicle 102 with which the route control system 200 is implemented. In the illustrated example, sensors 116 include vehicle speed sensor 222, image sensor 224, road sensor 226, weather sensor 228, and clock 230. Additional sensors 232 can also be included as may be appropriate for a given implementation of route control system 200.

Vehicle systems 158 can include any of a number of different vehicle components or subsystems used to control or monitor various aspects of the vehicle and its performance. In this example, the vehicle systems 158 include a vehicle position system 272, an autonomous driving system 274, an inter-vehicle communications system 276, and other vehicle systems 282. Vehicle position system 272 may determine a geographic position of the vehicle, as well as its direction and speed. Vehicle position system 272 may include a global positioning satellite (GPS) system or the like. The autonomous driving system 274 may operate the vehicle 102 in autonomous driving modes including Level 2 and Level 3 modes. The inter-vehicle communications system 276 performs automatic vehicle-to-vehicle radio communications to exchange data as described herein, and may include a dedicated short-range communications (DSRC) device or the like.

During operation, route control circuit 210 can receive information from various vehicle sensors to determine whether the route control mode should be activated. Also, the driver may manually activate the route control mode by operating route control 205. Communication circuit 201 can be used to transmit and receive information between route control circuit 210 and sensors 116, and route control circuit 210 and vehicle systems 158. Also, sensors 116 may communicate with vehicle systems 158 directly or indirectly (e.g., via communication circuit 201 or otherwise).

In various embodiments, communication circuit 201 can be configured to receive data and other information from sensors 116 that is used in determining whether to activate the route control mode. Additionally, communication circuit 201 can be used to send an activation signal or other activation information to various vehicle systems 158 as part of entering the route control mode. For example, as described in more detail below, communication circuit 201 can be used to send signals to, for example, the autonomous driving system 274. Examples of this are described in more detail below.

Figure 3:
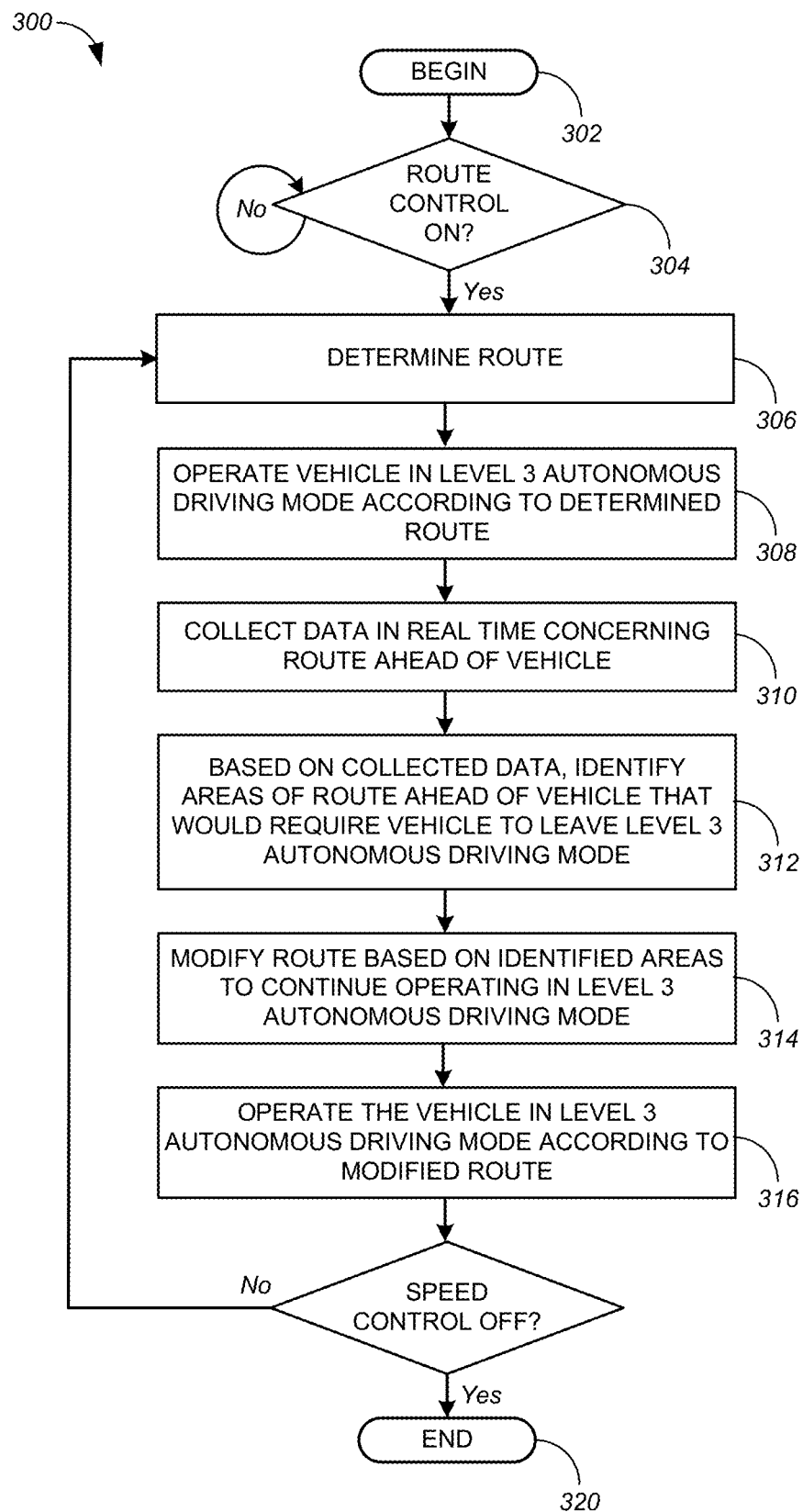
FIG. 3 is a flowchart illustrating a process for controlling the route of a vehicle according to one embodiment.

FIG. 3 is a flowchart illustrating a process 300 for controlling the route of a vehicle according to one embodiment. Referring to FIG. 3, the process 300 begins, at 302. The route control circuit 210 first determines whether the route control mode is on, at 304. This may include determining whether the route control mode has been activated, for example manually by the driver using the route control 205. The route control circuit 210 continues this determination until the route control mode is activated.

When the route control mode is activated, the route control circuit 210 determines a route, at 306. The route may be determined by any manner. For example, the route may be entered by a user with a smart phone, or using the head unit of the vehicle and a map database. The route may specify a destination, particular roads, and specify particular lanes of those roads. The autonomous driving system 274 operates the vehicle 102 in Level 3 autonomous driving mode according to the determined route, at 308.

The route control circuit 210 collects data in real time concerning the route ahead of the vehicle 102, at 310. The data may be collected from the vehicle sensors 152, from other vehicles via the inter-vehicle communications system 276, from the cloud, and from other sources. The data collected may include the location of the vehicle 102, the velocity of the vehicle 102, and data concerning conditions of the route ahead of the vehicle 102. In particular, the data collected describes the existence of areas where the vehicle 102 may make a safe automatic stop.

Based on the collected data, the route control circuit 210 identifies areas of the route ahead of the vehicle 102 that would require the vehicle 102 to leave the Level 3 autonomous driving mode, at 312. In this description, areas where the vehicle 102 would be required to leave Level 3 autonomous driving mode are referred to as "Level 2 or lower areas." One condition that would identify an area as a Level 2 is the absence of an area where the vehicle 102 may make a safe automatic stop. But while various embodiments are described in terms of this condition, they are not limited to this condition and may consider other conditions as well. And these Level 2 or lower areas are not limited to Level 2 autonomous driving, but may require dropping to Level 1 or even manual driving.

Figure 4:
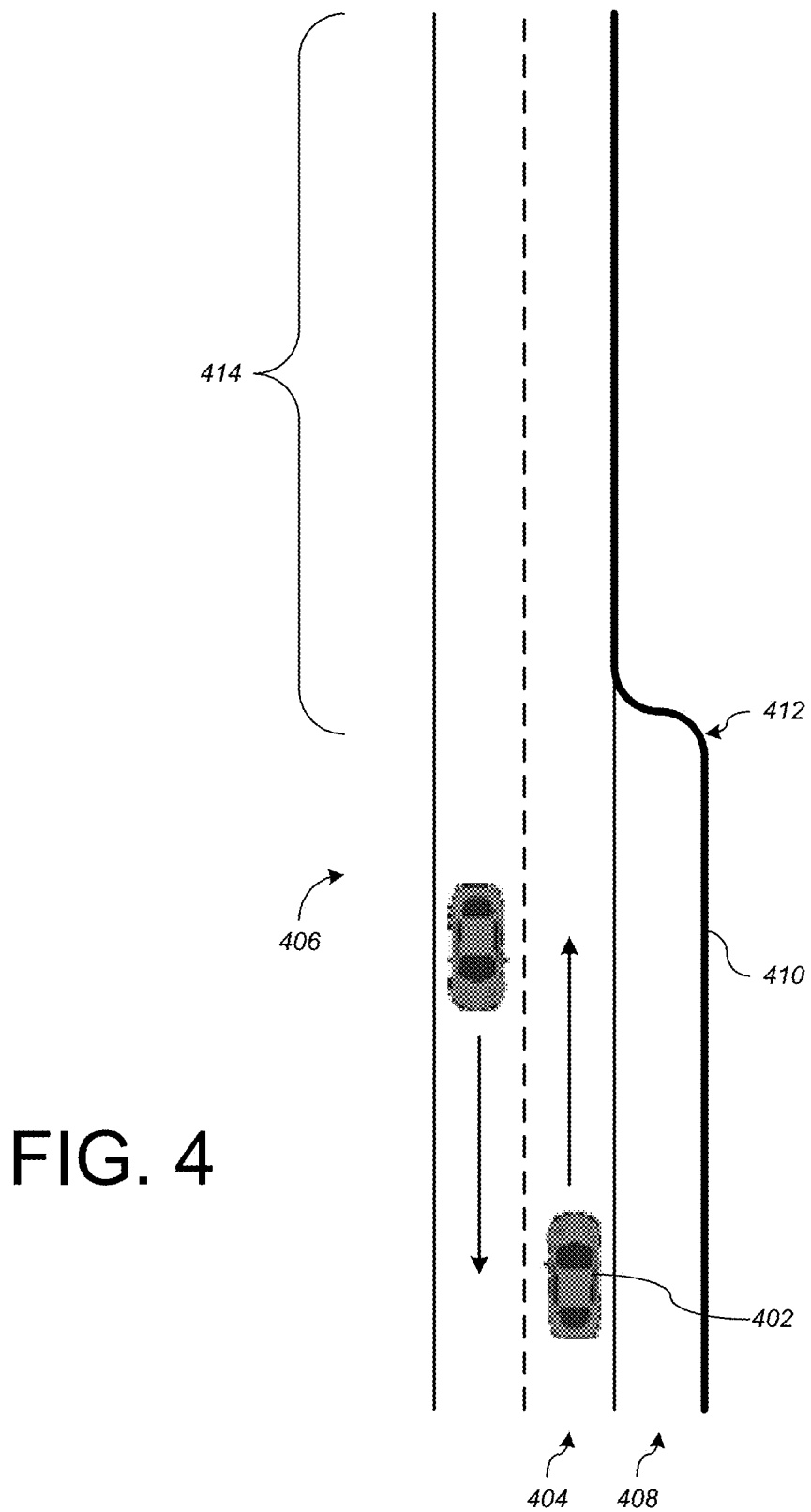
FIG. 4 illustrates a scenario where no road shoulder is available for a safe automatic stop.

FIG. 4 illustrates a scenario where no road shoulder is available for a safe automatic stop. Referring to FIG. 4, a car 402 is traveling in a lane 404 of a two-way road 406. A barrier 410 defines a road shoulder at 408 but at 412 bends toward the roadway, thereby terminating the road shoulder 408. Therefore, with no area for a safe automatic stop, area 414 is determined to be a Level 2 area.

Figure 5:
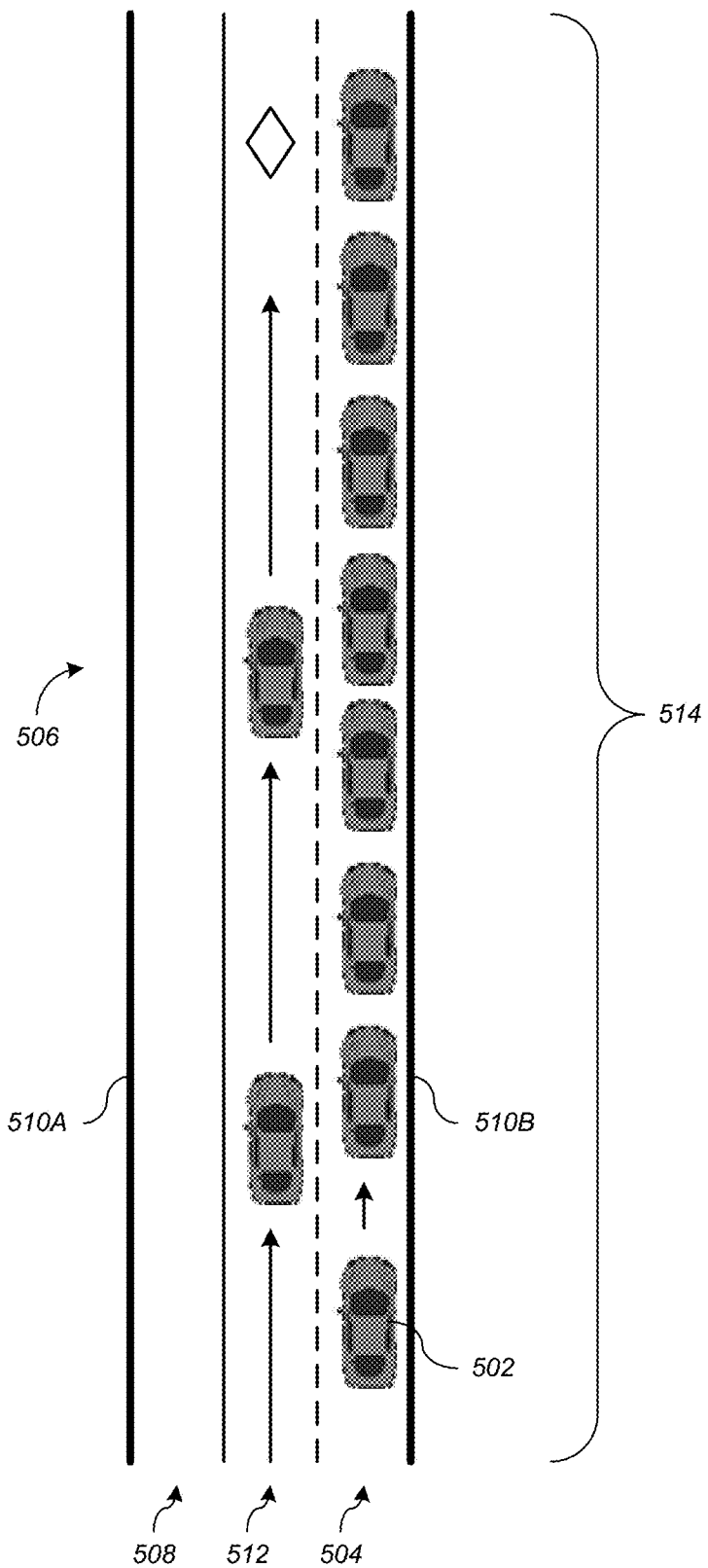
FIG. 5 illustrates a scenario where a road shoulder is available for an automatic stop, but cannot be safely accessed by a vehicle.

FIG. 5 illustrates a scenario where a road shoulder is available for an automatic stop, but cannot be safely accessed by a vehicle 502. Referring to FIG. 5, the vehicle 502 is traveling slowly in heavy traffic in a lane 504. A barrier 510B to the right of lane 504 eliminates any shoulder on the right side of the road. A shoulder 508 is available on the left side of the road, and is defined by a barrier 510A. However, the shoulder 508 on the left side of the road is not safely accessible by the vehicle 502 because the vehicle 502 would have to cross a high speed carpool lane 512. Therefore, with no area for a safe automatic stop, area 514 is determined to be a Level 2 area. The presence of the slower traffic blocking the shoulder can be sensed ahead of time via real-time traffic, vehicle-to-vehicle communication or vehicle to infrastructure communication.

Figure 6A:
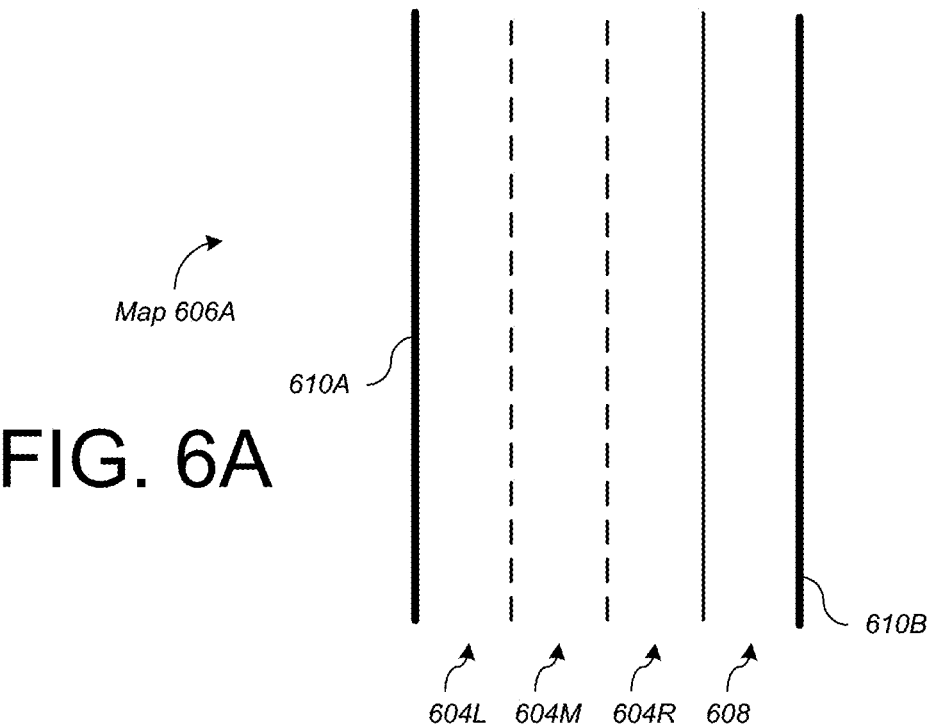
FIGS. 6A and 6B illustrate a scenario involving a construction zone not shown in a high precision map.
Figure 6B:
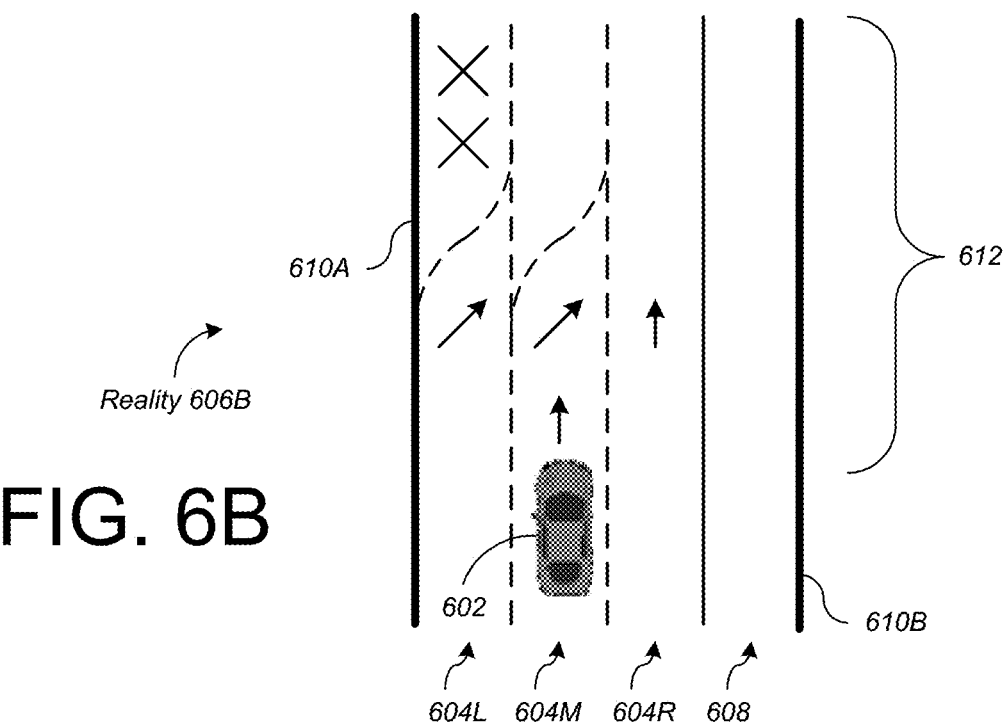

FIGS. 6A,B illustrate a scenario involving a construction zone not shown in a high precision map. Referring to FIGS. 6A,B, the road 606 includes a left lane 604L, a middle lane 604M, a right lane 604R, and a shoulder 608, with a barrier 610A on the left side of the road 606, and a barrier 610B on the right side of the shoulder 608. In FIG. 6A, the high precision map indicates that all travel lanes 604 are open. But in reality, as shown in FIG. 6B, a construction zone 612 has been established, where the left lane 604L has been closed, and traffic is being diverted from lanes 604L,M to lanes 604M,R, with the two lanes 604M,R merging into a single lane 604R. The vehicle 602 may detect this situation ahead of time via real-time traffic, vehicle-to-vehicle communication, or vehicle to infrastructure communication. Even with the shoulder 608 available for a safe automatic stop, the route control circuit 210 may identify the construction zone 612 as a Level 2 or lower area. Consequently, the route control circuit 210 may cause the vehicle 602 to drop to Level 2 or lower, or if possible may reroute the vehicle 602 to avoid the construction zone 612.

The route control circuit 210 modifies the route based on the identified Level 2 or lower areas to continue operating in Level 3 autonomous driving mode, at 314. In particular, the route control circuit 210 modifies the route to avoid the identified Level 2 or lower areas. In some embodiments, the route control circuit 210 may modify the route subject to one or more constraints. Example constraints include a maximum trip time, a maximum trip mileage, a maximum increase in trip drive time, a maximum increase in trip mileage, a maximum percentage increase in trip drive time, a maximum percentage increase in trip mileage, a desired time of arrival at a destination, and the like.

In some embodiments, the route control circuit 210 obtains permission from an occupant of the vehicle before modifying the route. In such embodiments, the route control circuit 210 presents the proposed route to occupants of the vehicle, for example as a visual display on a screen or as an audio prompt, and modifies the route only after receiving a confirmation from the occupant. Having modified the route, the route control circuit 210 continues to operate the vehicle in Level 3 autonomous driving mode according to the modified route, at 316.

Figure 7:
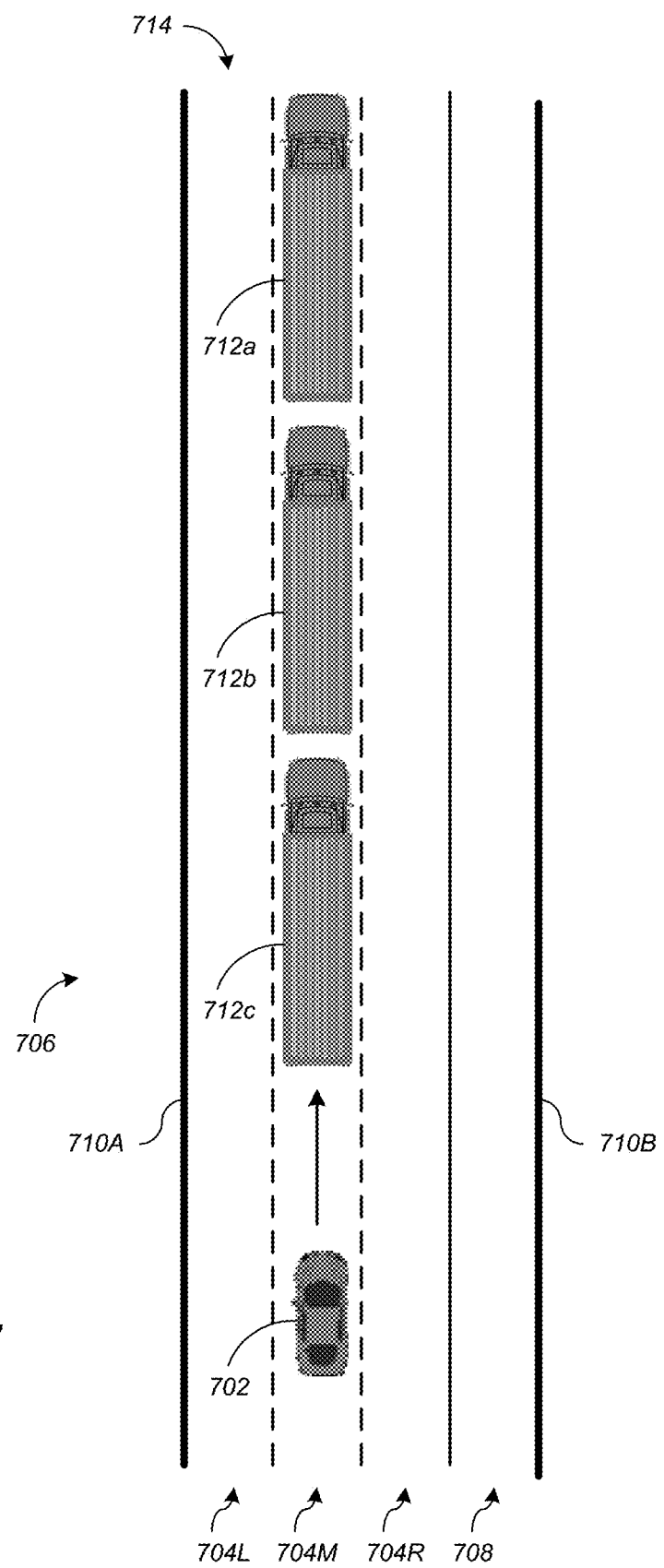
FIG. 7 illustrates a scenario where modifying the route of a vehicle includes navigating to a different lane of a road.
Figure 8:
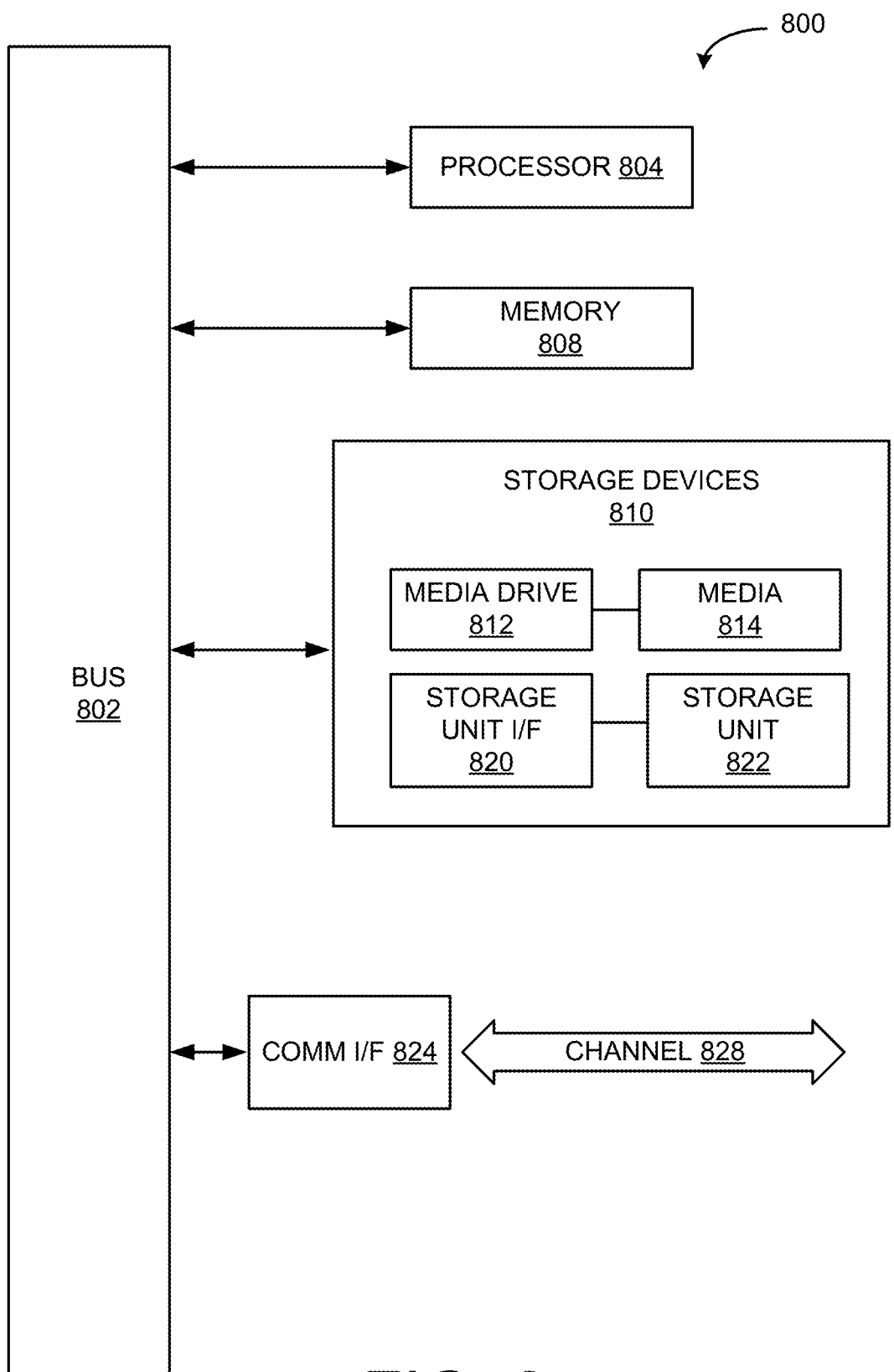
FIG. 8 shows an example computing component capable of carrying out the functionality described with respect thereto.

Modifying the route may include selecting different roads. Modifying the route may also include selecting different lanes of a road. FIG. 7 illustrates a scenario where modifying the route includes selecting a different lane of a road 706. Referring to FIG. 7, the road 706 includes a left lane 704L, a middle lane 704M, a right lane 704R, and a shoulder 708, with a barrier 710A on the left side of the road 706, and a barrier 710B on the right side of the shoulder 708. In the middle lane 704M, a car 702 is rapidly approaching a convoy of slow moving trucks 712a,b,c. With no shoulder on the left side for a safe stop and access to the right shoulder blocked by the truck convoy (or other heavy traffic), the left lane 704L is identified as a Level 2 area 714. Therefore, to allow the car 702 to pass the trucks 712a,b,c, the route control circuit 210 causes the autonomous driving system 274 to navigate the car 702 into the right lane 704R.

The route control circuit 210 occasionally determines whether the route control mode has been deactivated, at 318. While the route control mode is active, the route control circuit 210 continues to collect data concerning the route ahead of the vehicle, identify Level 2 or lower areas, and modify the route accordingly to continue operating in Level 3 autonomous driving mode. When the route control mode is deactivated, the process 300 ends, at 320.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up hybrid vehicle 102 and its component parts, for example such as the computing component. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
    a processor; and
    a non-transitory machine-readable storage medium encoded with instructions executable by the processor, the machine-readable storage medium comprising instructions to cause the processor to perform a method comprising:
    operating the vehicle in a Level 3 autonomous driving mode according to a first route;
    collecting data in real time concerning the first route ahead of the vehicle;
    based on the collected data, identifying areas of the first route ahead of the vehicle that would cause the vehicle to leave the Level 3 autonomous driving mode, the identified areas comprising a portion of a first lane of the first route from which a safe automatic stop of the vehicle cannot be performed;
    modifying the first route to a second route by a system of the vehicle, wherein the second route is based on selecting a second lane to avoid the first lane comprising the portion from which the safe automatic stop of the vehicle cannot be performed, and wherein the second route allows the vehicle to continue operating in the Level 3 autonomous driving mode along the second route; and
    operating the vehicle in a Level 3 autonomous driving mode according to the second route.

2. The vehicle of claim 1, wherein identifying areas of the first route ahead of the vehicle that would require the vehicle to leave the Level 3 autonomous driving mode comprises:
    identifying areas of the first route ahead of the vehicle where a safe automatic stop of the vehicle cannot be performed.

3. The vehicle of claim 1, wherein the method further comprises:
    modifying the first route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination.

4. The vehicle of claim 1, wherein the method further comprises:
    presenting the second route to an occupant of the vehicle; and
    modifying the first route to the second route only after receiving a confirmation of the second route from the occupant.

5. The vehicle of claim 1, wherein the method further comprises:
    collecting the data in real time using at least one of sensors on the vehicle, communication with other vehicles, a map database, and a position of the vehicle.

6. The vehicle of claim 1, wherein the portion of the first lane of the first route from which the safe automatic stop of the vehicle cannot be performed comprises a travel lane with no shoulder.

7. The vehicle of claim 1, wherein the portion of the first lane of the first route from which the safe automatic stop of the vehicle cannot be performed comprises a construction zone.

8. The vehicle of claim 1, wherein the data collected in real time is received from a pre-mapped database.

9. The vehicle of claim 1, wherein the data collected in real time is received from vehicle-to-vehicle communication.

10. The vehicle of claim 1, wherein the data collected in real time is real-time traffic information.

11. A non-transitory machine-readable storage medium encoded with instructions executable by a hardware processor of a computing component of a vehicle, the machine-readable storage medium comprising instructions to cause the hardware processor to perform a method comprising:
   operating the vehicle in a Level 3 autonomous driving mode according to a first route;
   collecting data in real time concerning the first route ahead of the vehicle;
   based on the collected data, identifying areas of the route ahead of the vehicle that would cause the vehicle to leave the Level 3 autonomous driving mode, the identified areas comprising a portion of a first lane of the first route from which a safe automatic stop of the vehicle cannot be performed;
   modifying the first route to a second route by a system of the vehicle, wherein the second route is based on selecting a second lane to avoid the first lane comprising the portion from which the safe automatic stop of the vehicle cannot be performed, and wherein the second route allows the vehicle to continue operating in the Level 3 autonomous driving mode along the second route; and
   operating the vehicle in a Level 3 autonomous driving mode according to the second route.

12. The medium of claim 11, wherein identifying areas of the first route ahead of the vehicle that would require the vehicle to leave the Level 3 autonomous driving mode comprises:
   identifying areas of the first route ahead of the vehicle where a safe automatic stop of the vehicle cannot be performed.

13. The medium of claim 11, wherein the method further comprises:
   modifying the first route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination.

14. The medium of claim 11, wherein the method further comprises:
   presenting the second route to an occupant of the vehicle; and
   modifying the first route to the second route only after receiving a confirmation of the second route from the occupant.

15. The medium of claim 11, wherein the method further comprises:
   collecting the data in real time using at least one of sensors on the vehicle, communication with other vehicles, a map database, and a position of the vehicle.

16. A method for operating a vehicle, the method comprising:
   operating the vehicle in a Level 3 autonomous driving mode according to a first route;
   collecting data in real time concerning the first route ahead of the vehicle;
   based on the collected data, identifying areas of the first route ahead of the vehicle that would cause the vehicle to leave the Level 3 autonomous driving mode, the identified areas comprising a portion of a first lane of the first route from which a safe automatic stop of the vehicle cannot be performed;
   modifying the first route to a second route by a system of the vehicle, wherein the second route is based on selecting a second lane to avoid the first lane comprising the portion from which the safe automatic stop of the vehicle cannot be performed, and wherein the second route allows the vehicle to continue operating in the Level 3 autonomous driving mode along the second route; and
   operating the vehicle in a Level 3 autonomous driving mode according to the second route.

17. The method of claim 16, wherein identifying areas of the first route ahead of the vehicle that would require the vehicle to leave the Level 3 autonomous driving mode comprises:
   identifying areas of the first route ahead of the vehicle where a safe automatic stop of the vehicle cannot be performed.

18. The method of claim 16, further comprising:
   modifying the first route based on the identified areas to continue operating in the Level 3 autonomous driving mode according to a constraint, wherein the constraint comprises at least one of a maximum trip time, a maximum trip mileage, a maximum increase in trip drive time, a maximum increase in trip mileage, a maximum percentage increase in trip drive time, a maximum percentage increase in trip mileage, and a desired time of arrival at a destination.

19. The method of claim 16, further comprising:
   presenting the second route to an occupant of the vehicle; and
   modifying the first route to the second route only after receiving a confirmation of the second route from the occupant.

* * * * *